United States Patent Office 3,256,334
Patented June 14, 1966

3,256,334
CYCLIC KETONES
Francis M. Scheidt, Midland, Mich., assignor to The Dow Chemical Company, Midland, Mich., a corporation of Delaware
No Drawing. Filed Apr. 3, 1963, Ser. No. 270,162
6 Claims. (Cl. 260—586)

This invention relates to a process for the production of cyclic ketones. More particularly, the present invention relates to a catalytic method of producing substituted cyclic ketones from cycloalkanones or mixtures of cycloalkanones and alkanones.

The self-condensation reaction of aldehydes and ketones which contain at least one hydrogen atom on a carbon atom adjacent to the carbonyl group is well known in the art and is termed an aldol condensation. The reaction is more properly designated as an aldol addition and is important because of the variety of products which may be produced. Much work has been done in an effort to apply this reaction to the production of cyclic ketones. The self-addition of cyclohexanone in the presence of hydrochloric acid is disclosed in British Patent No. 397,883. Another acid-catalyzed process for the self-condensation of cyclohexanone is disclosed in German Patent No. 857,960. The use of the proper catalyst in the process has a great effect upon both the product yield and purity. For example, refluxing cyclohexanone with potassium hydroxide in ethanol gives only about a 15 percent yield of cyclohexenyl cyclohexanone. Other cyclic ketones have been prepared by refluxing cyclopentanone through calcium carbide. The condensation of cyclopentanone and aldehydes in the presence of caustic is disclosed in U.S. Patent No. 2,069,861. Cycloheptanone has been reacted in the presence of both potassium tertiary-butoxide and calcium hydride, but with only moderate success.

It is an object of the present invention to provide a process for the preparation of cyclic ketones. A further object of the invention is to provide a process for carrying out an aldol addition reaction to produce cyclic ketones which are not contaminated with halogens or other side products which result from catalyst decomposition.

It has now been found that substituted cyclic ketones may be manufactured by passing a cycloalkanone (usually as a gas or a gaseous mixture of a cycloalkanone and an alkanone) through a catalyst bed containing an alkali metal phosphate salt (such as lithium phosphate) as the active catalytic component at a temperature of from 150° C. to 400° C.

The preferred catalyst used in the process is lithium phosphate (including lithium metaphosphate and lithium pyrophosphate), although other alkali metal phosphates such as sodium and potassium phosphates are also suitable. By using an alkali metal phosphate catalyst and a vapor phase feed of cycloalkanones to the reaction zone, the catalyst remains separated from the product mixture and there is no need for an additional step to remove the catalyst from the product. The catalyst may be employed in the form of a freshly precipitated and dried alkali metal phosphate catalyst, or the phosphates may be deposited on any suitable support in order to increase the catalyst contact area.

The alkali metal phosphate may be in the form of the ortho-, meta- or pyrophosphoric acid salt (i.e., an alkali metal salt of acids represented by the formula $$(H_2O)_n \cdot P_2O_5$$

wherein $n$ is an integer from 1 to 3). Typical salts which may be used include $Li_3PO_4$, $LiPO_3$ and $Li_4P_2O_7$.

The reaction zone is maintained at a temperature of from about 150° C. to 400° C. and the cycloalkanone reactant (or mixture of cycloalkanone and alkanone reactants) is sent through the reaction zone at an hourly space velocity (HSV) of from 0.01 to 10 kilograms of ketone feed per liter of catalyst. Ordinarily, hourly space velocities of from 0.1 to 3.0 kilograms of feed per liter of catalyst per hour are preferred. With lower space velocities, the conversions are generally higher than are obtained with higher space velocities. However, the condensation reaction occurs regardless of the feed rates used. The process may be operated continuously or batchwise. The effects of low conversions (resulting from very high feed rates of over 20 kilograms of feed per liter of catalyst per hour) may be offset by recycling. Thus, by separating the substituted cycloalkanones produced from the unreacted ketone feed, the products may be continuously removed and the unreacted ketones sent back to the reaction zone. By this method, substantially complete conversions to the cyclic ketone product may be obtained with only a few passes through the catalyst bed.

The process of the invention may be used to accomplish the aldol addition reaction and subsequent dehydration of any cyclic ketone capable of undergoing the self-addition or cross-addition reaction with other ketones. The reactions may be represented by the equations:

(1)
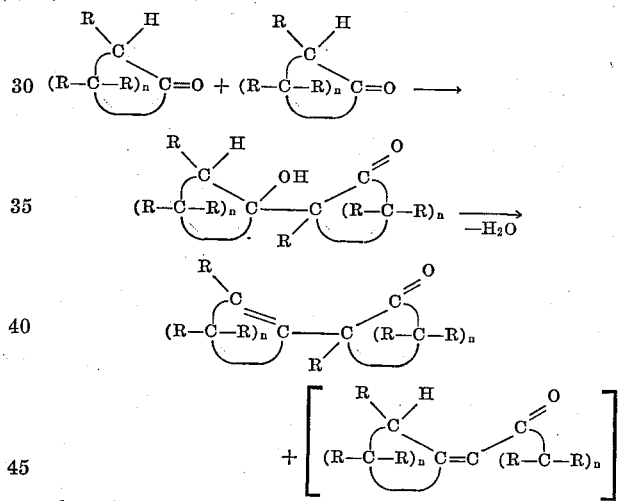

when the R group attached to one alpha carbon atom is hydrogen.

(2)
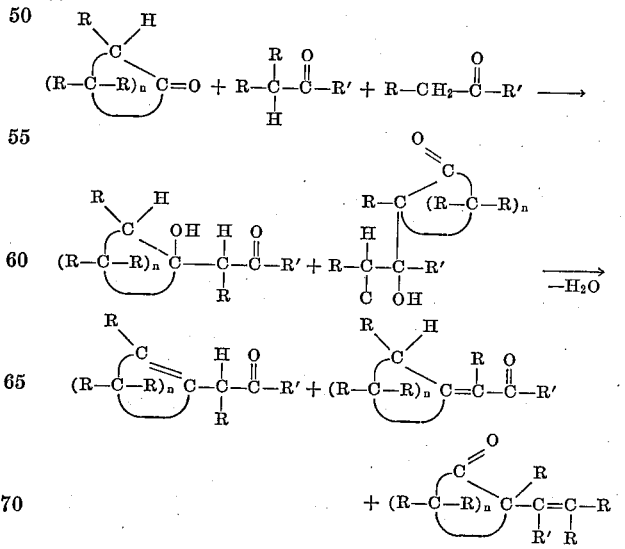

wherein n is an integer from 2 to 5, inclusive (preferably from 3 to 5), R' is an alkyl group of from 1 to 8 carbon atoms (preferably a lower alkyl group) and each R is independently selected from the group consisting of the hydrogen atom and a hydrocarbon group of from 1 to 8 carbon atoms, such as an alkyl, aryl or cycloalkyl group with from 1 to 8 carbon atoms. When R is a hydrocarbon group, R is preferably a lower alkyl group such as methyl, ethyl, n-propyl, i-propyl, n-butyl, i-butyl, sec.-butyl and tert.-butyl. Examples of cycloalkanones which may be reacted according to the process of the present invention include cyclohexanone, cyclopentanone and cycloheptanone. These ketones react to produce the corresponding substituted cyclic ketones: 2-(1-cyclohexen-1-yl)cyclohexanone, 2 - (1 - cyclopenten-1-yl)cyclopentanone and 2-(1-cyclohepten-1-yl)cycloheptanone, respectively. In addition, 2-cyclopentylidenecyclopentanone, 2-cyclohexylidenecyclohexanone and 2-cycloheptylidenecycloheptanone may be produced. With mixtures of cycloalkanones and alkanones of the formula

wherein each R is a lower alkyl group, the corresponding unsaturated cyclic ketones are obtained. Typical ketones which may be reacted with cycloalkanones include acetone, methyl ethyl ketone, diethyl ketone and alkyl ketones with from 1 to 8 carbon atoms in the alkyl moiety. For example, mixtures of cyclohexanone and acetone give the corresponding 1-cyclohexenylacetone and cyclohexylideneacetone. Similarly, a gaseous mixture of 4-tert.-butylcyclohexanone and acetone may be contacted in the presence of an alkali metal phosphate (or mixture of such phosphates) to produce the corresponding 4-tert.-butylcyclohexen-1-yl-acetone. Mixtures of cycloalkanones (such as cyclobutanone, cyclopentanone, cyclohexanone, cycloheptanone and lower alkyl substituted cycloalkanones) may also be reacted in the presence of an alkali metal phosphate (preferably lithium phosphate). Thus, a mixture of cyclohexanone and cyclopentanone may be reacted in the vapor phase in the presence of lithium phosphate to produce 2 - (1 - cyclohexen - 1 - yl) cyclopentanone, 2-(1-cyclopenten - 1 - yl)cyclohexanone and 2-cyclopentylidenecyclohexanone. Examples of substituted cycloalkanones which may be reacted include 3,4-dimethylcyclopentanone, 2,4-dimethylcyclobutanone, 3-methyl - 4 - ethylcyclohexanone and 4-tert.-butylcyclohexanone.

The process can be conducted at any pressure which permits the reactants to be maintained in the vapor state at temperatures of from 150° to 400° C. Generally, the reaction is carried out at atmospheric pressure, but subatmospheric or superatmospheric pressures may be employed, for example, to move the reactants and products through the reaction zone and provide the desired hourly space velocity. Cyclohexanone may be reacted in the vapor state to form 2-(1-cyclohexen-1-yl)cyclohexanone in the presence of lithium phosphate at a temperature of from 175° to 285° C. using a space velocity of from about 0.01 to 10 kilograms of cyclohexanone per liter of lithium phosphate catalyst per hour.

When the process is carried out using mixed ketones, the mole ratio of the different ketones may vary from 0.2:1 to 5:1. For example, cycloalkanone/alkanone (and cycloalkanone(1)/cycloalkanone(2), the numbers (1) and (2) denoting different cycloalkanones) molar feed ratios of from 1:5 to 5:1 may be employed.

The following examples are submitted for the purpose of illustration only and are not to be construed as limiting the scope of the invention in any way.

EXAMPLE I

The catalyst, consisting of 60 ml. (29 g.) of lithium phosphate ca. 4–8 mesh, was loaded into the reactor. The reactor used consisted of a stainless steel tube (0.72 inch inside diameter by 19 inches long within a heat transfer jacket filled with a mixture of diphenyl and diphenyl oxide). The jacket was wrapped with high resistance wire, heating of which was controlled by a variable transformer. The entire assembly was insulated with a 3-inch layer of steam-pipe insulation. A 0.19 inch outside diameter stainless steel tube extending along the longitudinal axis of the reactor tube served as a thermowell. Temperatures at points 1.5 inches, 5.5 inches and 9.5 inches below the surface of the catalyst bed were recorded by thermocouples located in the thermowell at these points. Cyclohexanone was pumped into the top of the reactor with a space velocity of 0.25 kg./liter of catalyst per hour. The temperature range within the bed during this 68-hour run was 262°–284° C. Samples were withdrawn from the product stream and analyzed. The results are summarized in Table 1.

Table 1

| Time (Hrs.) | Conversion of Cyclohexanone (Percent) | Selectivity to 2-(1-Cyclohexen-1-yl)cyclohexanone (Percent) |
|---|---|---|
| 1 | 45 | 82 |
| 24 | 45 | 87 |
| 68 | 24 | 98 |

Selectivity for the production of a particular compound is defined by the equation:

$$\text{Selectivity} = \frac{\text{Wt. of component in product}}{\text{Theoretical wt. of component which would be produced from the wt. of feed consumed}} \times 100\%$$

EXAMPLE II

The catalyst, consisting of 60 ml. (27 g.) of lithium phosphate, was loaded into a reactor similar to that employed in Example I. Cyclohexanone was pumped into the top of the reactor with a space velocity of 0.25 kg./liter of catalyst per hour. The reactor temperature was varied during the run. Samples withdrawn during the run were anlyzed. The results are given in Table 2.

Table 2

| Time in Hours (Cumulative) | Catalyst Temperature (° C.) | Conversion of Cyclohexanone (Percent) | Selectivity to 2-(1-cyclohexen-1-yl)cyclohexanone (Percent) |
|---|---|---|---|
| 0.7 | 183–203 | 21.5 | 89.3 |
| 1.7 | 237–250 | 38.7 | 89.9 |
| 2.5 | 285–301 | 59.9 | 58.9 |
| 3.3 | 335–349 | 56.7 | 48.5 |

EXAMPLE III

The reactor was charged with 60 ml. (27 g.) of lithium phosphate. Cyclopentanone was pumped into the top of the reactor with a space velocity of 1 kg./liter of catalyst per hour during 3.8 hours as the temperature within the catalyst bed ranged from 233° to 285° C. The total product was distilled and analyzed. Both 2-(1-cyclopenten-1-yl)cyclopentanone and 2-cyclopentylidenecyclopentanone were produced with selectivities of 14 percent and 53 percent, respectively, at 53 percent conversion.

EXAMPLE IV

The reactor was charged with 60 ml. (27 g.) of lithium phosphate. Cycloheptanone was pumped into the top of the reactor with a space velocity of 0.25 kg./liter of catalyst per hour during 3.2 hours as the temperature within the catalyst bed ranged from 260° to 285° C. The total product was distilled and analyzed. A selectivity of about 45 percent to 2-(1-cyclohepten-1-yl)cycloheptanone and about 45 percent to 2-cycloheptylidenecycloheptanone with a conversion of 23 percent was obtained.

EXAMPLE V

The reactor was charged with 60 ml. (26 g.) of lithium phosphate. A feed mixture composed of cyclohexanone and acetone in a mole ratio of 1:2 (cyclohexanone:acetone) was pumped into the top of the reactor with a space velocity of 0.25 kg./liter of catalyst per hour during 8 hours. The temperature within the catalyst bed ranged from 262° to 284° C. during the reaction. The total product was distilled. Infrared analysis of the major component of the product mix (B.P. 82°–87° C. at 11–12 mm.) indicated that it was composed of a mixture of 75–85 percent by weight cyclohexen-1-yl-acetone and 15–25 percent cyclohexylidene-acetone. This represents a selectivity of 62 percent to these two compounds with a conversion of feed of 40 percent.

EXAMPLE VI

In order to determine the effect of different mole ratios of cyclohexanone and acetone on the preparation of cyclohexenylacetone, the following experiment was run: Feed stocks were made up of various blends of cyclohexanone and acetone. The reactor was charged with 60 ml. (26 g.) of lithium phosphate. Each blend was passed through the catalyst bed with a space velocity of 0.25 kg./liter of catalyst per hour. During the run, the temperature range in the catalyst bed was 266° to 283° C. Samples were withdrawn from the product stream and analyzed. The results are given in Table 3.

priate material in the gas chromatograph exhaust. The infrared spectrum (2.5–15µ) was identical with that of an authentic sample of 2-(1-cyclohexen-1-yl)cyclohexanone.

EXAMPLE IX

The catalyst consisting of 60 ml. (26 g.) of lithium phosphate ($Li_3PO_4$) was loaded into a reactor similar to that employed in Example I. Cyclohexanone was pumped into the top of the reactor with several different space velocities. A sample was withdrawn from the product stream during a space velocity of 5.1 kg./liter of catalyst per hour and 154°–285° C. The sample showed a conversion of cyclohexanone of 17 percent with a selectivity of 87 percent to 2-(1-cyclohexen-1-yl)cyclohexanone. A similar sample withdrawn during a space velocity of 0.2 kg./liter of catalyst per hour and 279°–281° C. (the slowest space velocity possible with the equipment used) showed a conversion of 45 percent with a selectivity of 84 percent to 2-(1-cyclohexen-1-yl)cyclohexanone.

I claim as my invention:

1. A process for producing substituted cyclic ketones which comprises reacting a cycloalkanone of from 4 to 7 ring carbon atoms with a ketone selected from the group consisting of cycloalkanones with from 4 to 7 ring carbon atoms and alkanones with from 3 to 17 carbon atoms in the vapor phase at a temperature of from about 150° to 400° C. in the presence of a catalyst consisting essentially of an alkali metal phosphate.

2. The process of claim 1 wherein the alkali metal phosphate is lithium phosphate.

3. The process of claim 1 wherein the alkali metal phosphate is sodium phosphate.

*Table 3*

| Feed, Mole Ratio of Cyclohexanone to Acetone | Conversion of Feed (Percent) | Selectivity to Products (Percent by Weight of Products Recovered) | | | |
|---|---|---|---|---|---|
| | | 2-(1-cyclohexen-1-yl)cyclohexanone (Percent) | Cyclohexenyl Acetone and Cyclohexylidene Acetone (Percent) | By-products (Percent) | Temperature Range (° C.) |
| 4:1 | 27 | 67 | 15 | 18 | 266–283 |
| 2:1 | 43 | 58 | 30 | 12 | 265–280 |
| 1:1 | 44 | 38 | 44 | 18 | 269–283 |
| 1:2 | 45 | 26 | 55 | 19 | 266–280 |
| 1:4 | 29 | 12 | 61 | 27 | 260–283 |

EXAMPLE VII

The catalyst consisting of 60 ml. (46 g.) of sodium orthophosphate ($Na_3PO_4$) was loaded into a reactor similar to that employed in Example I. Cyclohexanone was pumped into the top of the reactor with a space velocity of 0.36 kg./liter of catalyst per hour. The temperature range within the catalyst bed was maintained at 270°–283° C. A sample was withdrawn from the product stream (after 1 hour) and showed a conversion of cyclohexanone of 29 percent with a selectivity to 2-(1-cyclohexen-1-yl)cyclohexanone of 87.6 percent.

EXAMPLE VIII

The catalyst consisting of 60 ml. (55 g.) of lithium pyrophosphate/graphite (weight ratio of 97/3) was loaded into a reactor similar to that employed in Example I. Cyclohexanone was pumped into the top of the reactor with a space velocity of 0.36 kg./liter of catalyst per hour. The temperature range within the bed was maintained at 271°–284° C. A sample withdrawn from the product stream after 1 hour showed a rather low conversion of cyclohexanone but with a selectivity to 2-(1-cyclohexen-1-yl)cyclohexanone of 85 percent. The identity of this product was verified by passing it through a gas chromatographic column and trapping the appro- 4. A process for producing substituted cyclic ketones which comprises contacting in the vapor phase a cycloalkanone of from 4 to 7 ring carbon atoms with a catalyst consisting essentially of lithium phosphate at a temperature of from 150° C. to 400° C.

5. The process of claim 4 wherein the catalyst temperature is from 175° C. to 285° C.

6. A process for the manufacture of 2-(1-cyclohexen-1-yl)cyclohexanone which comprises feeding cyclohexanone in the vapor state at a space velocity of from 0.01 to 10 kilograms of cyclohexanone per liter of catalyst per hour to a reaction zone containing a catalyst consisting essentially of lithium phosphate at a temperature of from 175° C. to 285° C.

References Cited by the Examiner

UNITED STATES PATENTS 2,288,306  6/1942  Wagner _____ 260—593

OTHER REFERENCES

Walker: "Formaldehyde" 3rd edition, 1964, pp. 98 and 299.

Astle et al.: "J. Org. Chem.," vol. 24, pp. 56–60 (1959).

LEON ZITVER, *Primary Examiner.*